(12) United States Patent
Hashimoto et al.

(10) Patent No.: US 9,964,009 B2
(45) Date of Patent: May 8, 2018

(54) OIL SUPPLY SYSTEM FOR ENGINE

(71) Applicant: Mazda Motor Corporation, Aki-gun, Hiroshima (JP)

(72) Inventors: Masanori Hashimoto, Hiroshima (JP); Hisashi Okazawa, Hiroshima (JP); Hiroaki Muranaka, Higashihiroshima (JP); Kimio Ishida, Aki-gun (JP); Hiroshi Hosokawa, Hiroshima (JP); Sho Ishigaki, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days. days.

(21) Appl. No.: 15/174,721

(22) Filed: Jun. 6, 2016

(65) Prior Publication Data
US 2016/0356188 A1    Dec. 8, 2016

(30) Foreign Application Priority Data

Jun. 8, 2015   (JP) ................................. 2015-115520

(51) Int. Cl.
| | |
|---|---|
| *F01M 1/16* | (2006.01) |
| *F01M 1/02* | (2006.01) |
| *F01M 1/08* | (2006.01) |

(52) U.S. Cl.
CPC ............... *F01M 1/16* (2013.01); *F01M 1/02* (2013.01); *F01M 1/08* (2013.01); *F01M 2001/0238* (2013.01); *F01M 2001/0246* (2013.01); *F01M 2250/62* (2013.01); *F16N 2250/04* (2013.01); *F16N 2250/08* (2013.01)

(58) Field of Classification Search
CPC ... F01M 1/16; F01M 1/02; F01M 1/08; F16N 2250/04
See application file for complete search history.

(56) References Cited

U.S. PATENT DOCUMENTS

2015/0053174 A1*   2/2015   Nishimoto .......... F02D 13/0207
                                                                    123/346

FOREIGN PATENT DOCUMENTS

JP          2014159757 A      9/2014

* cited by examiner

*Primary Examiner* — Kevin A Lathers
(74) *Attorney, Agent, or Firm* — Alleman Hall Creasman & Tuttle LLP

(57) ABSTRACT

An oil supply system for an engine is provided, which includes an oil pressure controller for controlling a variable displacement oil pump to adjust a discharge pressure thereof to reach a target oil pressure corresponding to an operating state of the engine, the variable displacement oil pump capable of adjusting a discharge amount of oil, a load detector for detecting an engine load, and an oil temperature detector for detecting an oil temperature. When the engine load is low, to increase an amount of oil mist flowing inside a crank case of the engine, the oil pressure controller controls the variable displacement oil pump to increase the discharge amount as the oil temperature becomes lower, the oil mist generated by the oil flowing out of a bearing part rotatably supporting at least a crankshaft and being atomized, the engine load being considered low when below a predetermined reference load.

5 Claims, 10 Drawing Sheets

| OPERATING STATE | LOAD | OIL TEMP (°C) | SPEED (rpm) | | | | | | | |
|---|---|---|---|---|---|---|---|---|---|---|
| | | | 500 | 700 | 1000 | 2000 | 3000 | 4000 | 5000 | 6000 | 7000 |
| — | — | T | OIL PRESSURE (kPa) | | | | | | | |
| | | | 50 | 100 | 200 | 200 | 200 | 200 | 200 | 300 | 400 |

FIG. 5

| OPERATING STATE | LOAD | OIL TEMP (°C) | SPEED (rpm) | |
|---|---|---|---|---|
| | | | 500 | 700 |
| - VEHICLE SPEED 3 km/h OR BELOW<br>- FULLY CLOSED ACCELERATOR | — | Ta1 | OIL PRESSURE (kPa) | |
| | | | 80 | 80 |
| | | Ta2 | 100 | 100 |
| | | Ta3 | 140 | 140 |
| | | Ta4 | 180 | 180 |

| OPERATING STATE | LOAD | OIL TEMP(°C) | SPEED (rpm) | Va1 OR ABOVE | Va2 OR ABOVE |
|---|---|---|---|---|---|
| — | P1 OR ABOVE | — | OIL PRESSURE (kPa) | 350 | 350 |
| | P2 OR ABOVE | | | 350 | 350 |

FIG. 8

| OPERATING STATE | LOAD | OIL TEMP (°C) | SPEED (rpm) | 500 | 1000 | 2000 | 3000 | 4000 | 5000 | 6000 | 7000 |
|---|---|---|---|---|---|---|---|---|---|---|---|
| — | — | Ta1 | OIL PRESSURE (kPa) | 0 | 250 | 250 | 250 | 250 | 300 | 300 | 300 |
| | | Ta2 | | 0 | 300 | 300 | 350 | 350 | 350 | 350 | 350 |
| | | Ta3 | | 0 | 350 | 400 | 400 | 400 | 400 | 400 | 400 |

OIL SUPPLY SYSTEM FOR ENGINE

BACKGROUND

The present invention relates to an oil supply system for an engine, specifically, an oil supply system for an engine which is capable of reducing engine noise by securing lubricating oil films of drive force transmission system members (e.g., a piston pin and a connecting rod) for transmitting a drive force due to combustion, when an engine load is low (e.g., during an idle operation).

Conventionally, oil supply systems for supplying engine oil (hereinafter, simply referred to as "oil") to various parts of an engine mounted on a vehicle (e.g., automobile) are well known. For example, JP2014-159757A (particularly paragraphs [0010]-[0013]) discloses an art of controlling a variable displacement oil pump to adjust, to a target oil pressure, a required oil pressure of a device using oil as operational oil, when a required oil pressure of the device is higher than that of a device using the oil as cooling oil and is also higher than that of a device using the oil as lubricating oil and cooling oil. Thus, a drive force of an oil pump is suppressed to a necessary minimum level and a fuel consumption is improved, while satisfying the required oil pressures of all the devices.

However, by adjusting a discharge amount (further discharge pressure) of the variable displacement oil pump according to the required oil pressures of the devices as in JP2014-159757A, for example, when an engine load is low (e.g., during an idle operation) in a warming-up operation state, engine noise may increase for the following reasons.

First, sliding surfaces of drive force transmission system members (e.g., a pin boss of a piston, a piston pin, and a smaller end part of a connecting rod) for transmitting a drive force due to combustion are lubricated by an oil mist. Specifically, for example, oil leaked from, for example, a bearing metal of a crankshaft bearing rotatably supporting a crankshaft is spread and atomized (becomes a mist) by rotation of the crankshaft, and becomes an oil mist flowing inside a crank case. The oil mist permeates and attaches to the sliding surfaces of the drive force transmission system members and lubricating oil films are formed thereon. Thus, a to-be-lubricated surface (sliding surface) is lubricated by an atmosphere with an oil mist even without being supplied with lubricating oil from the oil pump. Such lubrication is referred to as "atmospheric lubrication."

On the other hand, after the engine is warmed up, the discharge amount of the variable displacement oil pump is adjusted to achieve the required oil pressure according to an operating state of the engine, and the drive force of the oil pump is suppressed to the necessary minimum level. In other words, an oil pressure controller is provided, which controls the variable displacement oil pump to adjust the discharge pressure of the variable displacement oil pump, which is capable of adjusting the discharge amount of oil, to be the target oil pressure according to the operating state. In this case, the required oil pressure, further the target oil pressure, is set lower as the engine load becomes lower. Therefore, when the engine load is low (e.g., during the idle operation) in the warming-up operation state, the discharge amount of the oil pump is reduced, which causes reduction of the generation amount of oil mist. As a result, the atmospheric lubrication by the oil mist, in other words, the formation of the lubricating oil films on the sliding surfaces of the drive force transmission system members or a formation of a lubricating oil film between sliding surfaces of a piston skirt and a cylinder liner, etc., becomes insufficient and causes increased engine noise when the piston operates.

SUMMARY

The present invention is made in view of the above problems and aims to solve inconveniences with oil supply systems for engines by providing an oil supply system for an engine, which is capable of reducing engine noise by securing lubricating oil films of drive force transmission system members by an oil mist even when an engine load is low (e.g., during an idle operation).

According to one aspect of the present invention, an oil supply system for an engine is provided. The oil supply system includes an oil pressure controller for controlling a variable displacement oil pump to adjust a discharge pressure thereof to reach a target oil pressure corresponding to an operating state of the engine, the variable displacement oil pump capable of adjusting a discharge amount of oil, a load detector for detecting an engine load, and an oil temperature detector for detecting a temperature of the oil. When the engine load detected by the load detector is low, to increase an amount of oil mist flowing inside a crank case of the engine, the oil pressure controller controls the variable displacement oil pump to increase the discharge amount as the oil temperature detected by the oil temperature detector becomes lower, the oil mist generated by the oil flowing out of a bearing part rotatably supporting at least a crankshaft, and being atomized, the engine load being considered low when falling below a predetermined reference load.

With this configuration, since the discharge amount of the variable displacement oil pump is increased to raise the oil mist amount inside the crank case as the oil temperature becomes lower when the engine load is low (e.g., during an idle operation), an atmospheric lubrication performance by the oil mist, in other words, lubricating oil films of sliding surfaces of drive force transmission system members (e.g., a piston pin and a connecting rod), is secured even when the engine load is low (e.g., during the idle operation). Thus, the lubrication oil films become cushions and engine noise can be reduced.

The oil pressure controller may perform a discharge amount control of the variable displacement oil pump when the engine load is low in a warming-up operation state of the engine.

With this configuration, particularly, the discharge amount is adjusted to achieve a required oil pressure corresponding to the engine operating state, and when the engine load is low in the warming-up operation state of engine in which a drive force of the variable displacement oil pump can be suppressed to a necessary minimum level, the atmospheric lubrication performance by the oil mist is secured and the engine noise can reliably be reduced.

The oil supply system may further include a first device using oil as operational oil thereof, a second device using oil as lubricating oil thereof, and a discharge pressure detector for detecting the discharge pressure of the variable displacement oil pump. The oil pressure controller may set, to a target oil pressure, a highest required oil pressure among required oil pressures set for the respective devices according to the operating state of the engine, and the oil pressure controller may control the variable displacement oil pump to adjust the discharge pressure detected by the discharge pressure detector to reach the target oil pressure.

With this configuration, the drive force of the variable displacement oil pump is suppressed to the necessary minimum level and a fuel consumption can be improved, while satisfying required oil pressures of all the devices corresponding to the engine operating state.

The oil pressure controller may include a base oil pressure memory storing a base oil pressure set according to an engine speed at a predetermined oil temperature, a first memory storing an oil pressure set to increase the discharge amount as the oil temperature becomes lower when the engine load is low, a second memory storing a required oil pressure set for the first device according to the operating state of the engine, and a setting module for setting the highest oil pressure among the oil pressures stored in the memories, to be the target oil pressure according to the operating state of the engine.

With this configuration, the target oil pressure corresponding to the engine operating state can reliably be set with the simple configuration. Additionally, due to the existence of the first memory, a sufficient atmospheric lubrication performance by the oil mist when the engine load is low can be secured.

The first device may be a variable valve timing mechanism. The oil pressure controller may restrict operation of the variable valve timing mechanism when the engine load is low.

With this configuration, by restricting the operation of the variable valve timing mechanism, it can be suppressed that a large part of the discharge amount of the variable displacement oil pump which has already been increased flows to the variable valve timing mechanism and is consumed. Therefore, the oil mist amount for the atmospheric lubrication can reliably be increased with the simple configuration.

BRIEF DESCRIPTION OF THE DRAWINGS

FIG. 5 is a base oil pressure map adopted by the oil supply system.

FIG. 6 is an atmospheric-lubrication-improving oil pressure map adopted by the oil supply system.

FIG. 7 is a required oil pressure map for an oil jet, adopted by the oil supply system.

FIG. 8 is a required oil pressure map for an exhaust variable valve timing (VVT), adopted by the oil supply system.

DETAILED DESCRIPTION OF EMBODIMENT

Hereinafter, one embodiment of the present invention is described in detail with reference to the appended drawings.

This embodiment relates to an oil supply system for an engine which increases, when an engine load is low (e.g., during an idle operation), a discharge amount of a variable displacement oil pump as an oil temperature becomes lower, so as to increase an amount of oil mist flowing inside a crank case to secure an atmospheric lubrication by the oil mist, in other words, a formation of lubricating oil films of sliding surfaces of drive force transmission system members (e.g., a piston, a piston pin, and a connecting rod), and thus, engine noise can be reduced.

In this embodiment, for the sake of convenience, axial directions of a cylinder bore are referred to as up-and-down directions, and cylinder-line directions are referred to as front-and-rear directions of which a side opposite from a transmission of an engine is referred to as a front side and the transmission side of the engine is referred to as a rear side. Further, as described later, devices using oil as operational oil, such as an exhaust variable valve timing mechanism (exhaust VVT) 18 and oil jets 71, are referred to as hydraulically-operated devices, and devices using oil as lubricating oil, such as bearing parts (e.g., bearing metals 29) of crankshaft bearings 28, are referred to as to-be-lubricated parts.

Figure 1:
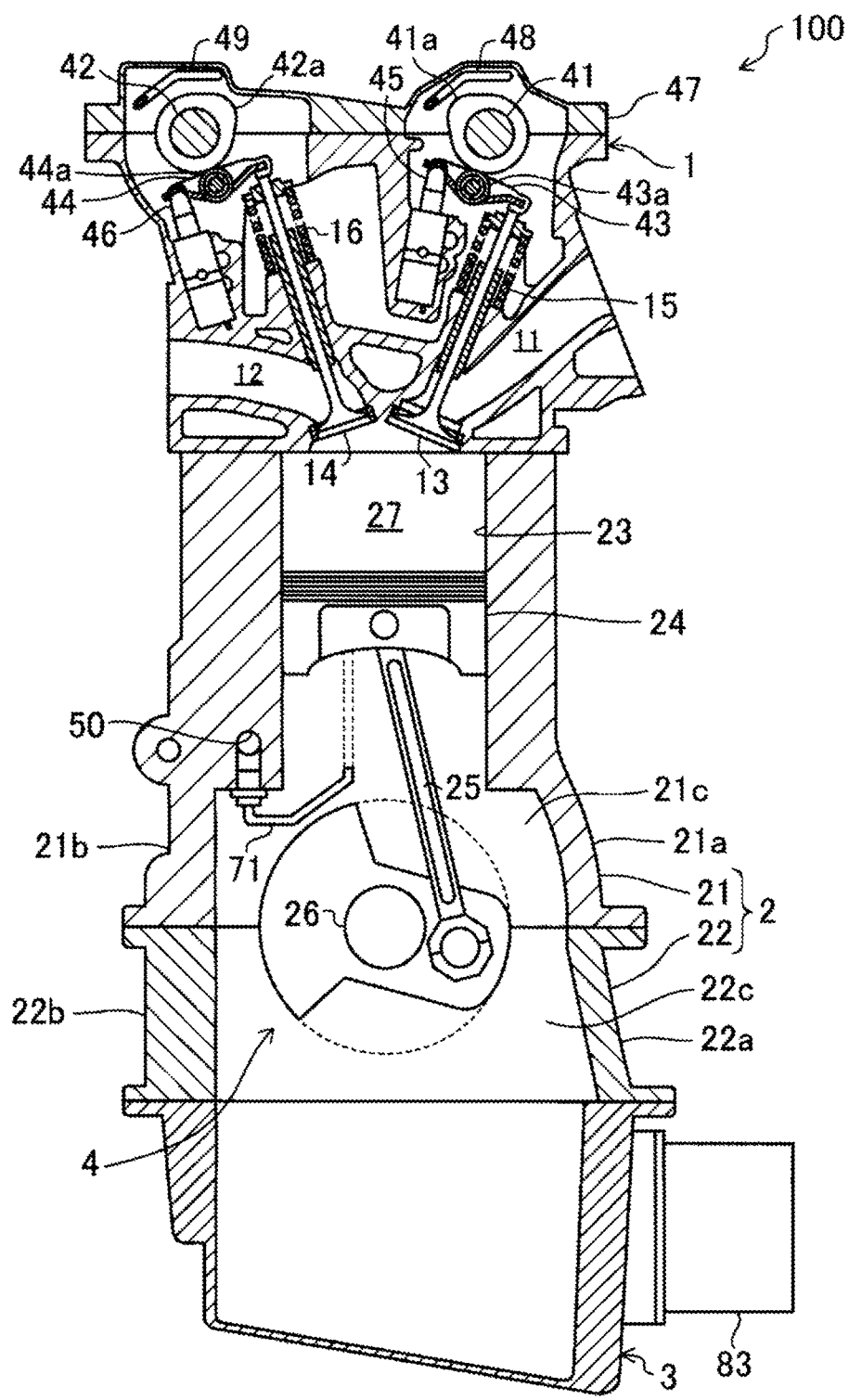
FIG. 1 is a schematic cross-sectional view illustrating an engine according to one embodiment of the present invention, cut in a plane including an axis of a cylinder bore of the engine.

FIG. 1 is a schematic cross-sectional view illustrating the engine 100 according to this embodiment, cut in a plane including the axis of the cylinder bore 23 of the engine 100. The engine 100 of this embodiment is a four-cycle gasoline engine of an inline four-cylinder spark-ignition type including four cylinders (first to fourth cylinders in this order from the front side) arranged in the front-and-rear directions of a vehicle (not illustrated) on which the engine of this embodiment is mounted. The engine 100 includes a cylinder head 1, a cylinder block 2 attached to a bottom surface of the cylinder head 1, and an oil pan 3 attached to a bottom surface of the cylinder block 2.

Figure 2:
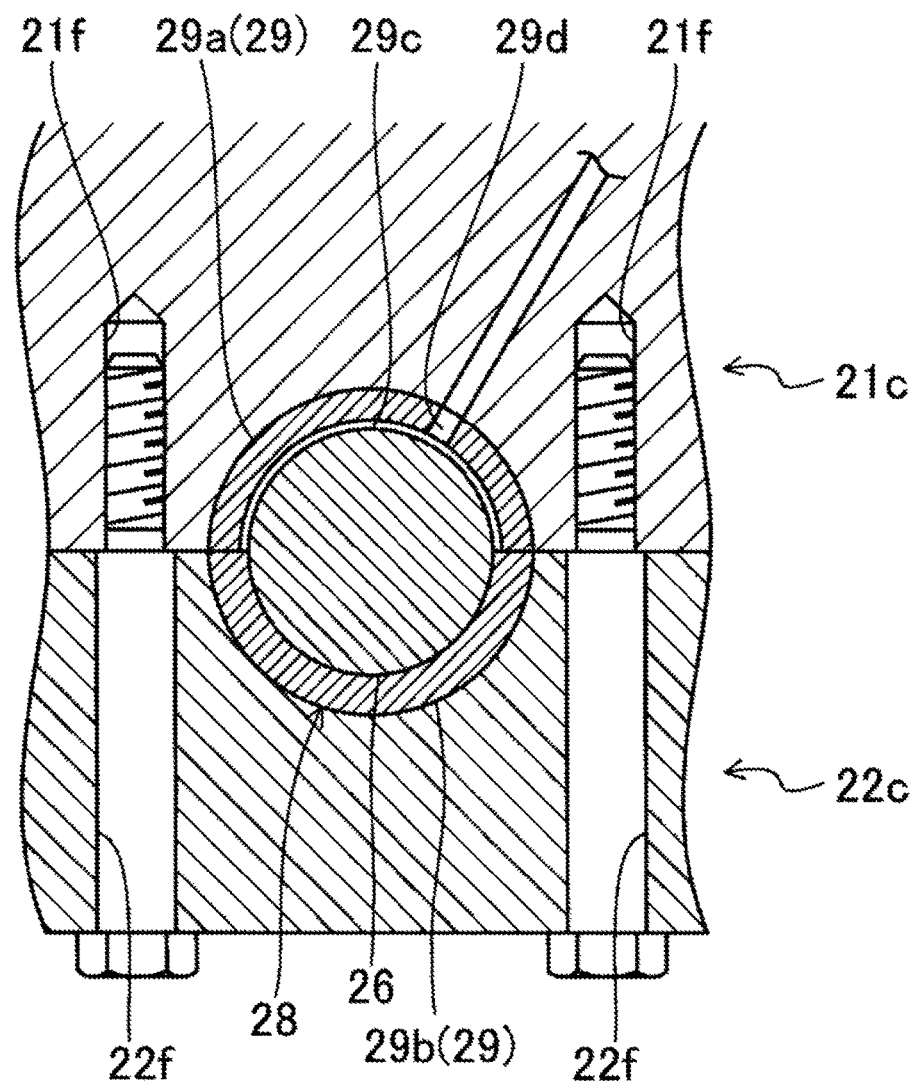
FIG. 2 is a vertical cross-sectional view of a crankshaft of the engine.

The cylinder block 2 includes an upper block 21 and a lower block 22 attached to a lower surface of the upper block 21 by bolts (see FIG. 2). The upper and lower blocks 21 and 22 cooperate with each other to constitute a crank case 4. In an upper part of the upper block 21, four cylinder bores 23 (only one of them is illustrated in FIG. 1) corresponding to the four cylinders are formed in the front-and-rear directions in line. A piston 24 is inserted through each cylinder bore 23. Each piston 24 is coupled to a crankshaft 26 via a pin boss (not illustrated), a piston pin, and a connecting rod 25. The cylinder bore 23, the piston 24, and the cylinder head 1 define a combustion chamber 27. Although not illustrated, a fuel injector for injecting fuel (gasoline) into the combustion chamber 27 and an ignition plug for spark-igniting mixture gas within the combustion chamber 27 are provided.

In this embodiment, sliding surfaces of drive force transmission system members (e.g., the piston 24, the pin boss of the piston 24, the piston pin, and a smaller end part of the connecting rod 25) for transmitting a drive force due to combustion are atmospherically lubricated by oil mist. Specifically, for example, oil leaked from the bearing metals 29 (see FIG. 2) of the crankshaft bearings 28 for rotatably supporting journals of the crankshaft 26 is spread and atomized (becomes mist) by rotation of the crankshaft 26 and becomes an oil mist flowing inside the crank case 4. Lubricating oil films are formed on the sliding surfaces of the drive force transmission system members with the oil mist.

An intake port 11 (right side in FIG. 1) and an exhaust port 12 (left side in FIG. 1) opening to the combustion chamber 27 are formed in the cylinder head 1, an intake valve 13 for opening and closing the intake port 11 is provided to each intake port 11, and an exhaust valve 14 for opening and closing the exhaust port 12 is provided to each exhaust port 12. The intake and exhaust valves 13 and 14 are driven by cam parts 41a and 42a of intake and exhaust camshafts 41 and 42, respectively. The intake and exhaust valves 13 and 14 are biased to closing directions thereof (upper side in FIG. 1) by valve springs 15 and 16, respectively. An intake swing arm 43 is provided between the intake valve 13 and the cam part 41a and an exhaust swing arm 44 is provided between the exhaust valve 14 and the cam part 42a.

One end parts of the swing arms 43 and 44 are supported by intake and exhaust hydraulic lash adjusters (HLA) 45 and 46 (hydraulically-operated devices), respectively. Cam followers 43a and 44a are provided substantially at the center of the swing arms 43 and 44, respectively. As the cam followers 43a and 44a are pushed by the cam parts 41a and 42a, the swing arms 43 and 44 swing on fulcrums that are the one end parts supported by the HLAs 45 and 46, respectively. By the swings of the swing arms 43 and 44, the other end parts move the intake and exhaust valves 13 and 14 to opening directions thereof (lower side in FIG. 1) against biasing forces of the valve springs 15 and 16, respectively. The HLAs 45 and 46 automatically adjust valve clearances to zero by using oil pressure. In the cylinder head 1, attaching holes to which the HLAs 45 and 46 are attached are formed for the respective cylinders, and an oil supply path 5 (see FIG. 4: specifically, first, second, fourth and fifth oil supply paths 55, 56, 58, and 59) is formed to communicate with the attaching holes. The HLAs 45 and 46 attached to the attaching holes are supplied with the oil via the oil supply path 5 (55, 56, 58, and 59).

A cam cap 47 is attached to an upper part of the cylinder head 1. The camshafts 41 and 42 are rotatably supported by the cylinder head 1 and the cam cap 47. Although not illustrated, cam bearings rotatably supporting journals of the camshafts 41 and 42, respectively, and bearing metals (to-be-lubricated parts) are provided between the cylinder head 1 and the cam cap 47. Intake and exhaust oil showers 48 and 49 (to-be-lubricated parts) are provided above the intake and exhaust camshafts 41 and 42, respectively. The intake and exhaust oil showers 48 and 49 drop oil to a contacting part of the cam part 41a and the cam follower 43a of the swing arm 43 and a contacting part of the cam part 42a and the cam follower 44a of the swing arm 44, respectively.

The upper block 21 has a first side wall 21a located on the intake side of the four cylinder bores 23, a second side wall 21b located on the exhaust side thereof, a front wall (not illustrated) located on the front side of the front most cylinder bore 23 (corresponding to the first cylinder), a rear wall (not illustrated) located on the rear side of the rear most cylinder bore 23 (corresponding to the fourth cylinder), and three vertical walls 21c located between adjacent cylinder bores 23 and extending from the exhaust side to the intake side.

The lower block 22 has a first side wall 22a located on the intake side corresponding to the first side wall 21a of the upper block 21, a second side wall 22b located on the exhaust side corresponding to the second side wall 21b, a front wall (not illustrated) located on the front side corresponding to the front wall of the upper block 21, a rear wall (not illustrated) located on the rear side corresponding to the rear wall of the upper block 21, and three vertical walls 22c corresponding to the vertical walls 21c.

As illustrated in FIG. 2, a pair of the crankshaft bearings 28 rotatably supporting the journals of the crankshaft 26, and the bearing metals 29 (to-be-lubricated part) is provided between the front wall of the upper block 21 and the front wall of the lower block 22, between the rear wall of the upper block 21 and the rear wall of the lower block 22, between each vertical wall 21c of the upper block 21 and the corresponding vertical wall 22c of the lower block 22.

FIG. 2 is a vertical cross-sectional view of the crankshaft of the engine, more specifically, a vertical cross-sectional view of the crankshaft bearing 28 and the bearing metal 29 between the middle vertical wall 21c of the upper block 21 (located at the center among the three walls 21c in the cylinder-line directions) and the middle vertical wall 22c of the lower block 22 (located at the center among the three walls 22c in the cylinder-line directions). Note that the crankshaft bearing 28 and the bearing metal 29 between the front walls of the upper and lower blocks 21 and 22, and the crankshaft bearing 28 and the bearing metal 29 between the rear walls of the upper and lower blocks 21 and 22 are similar to FIG. 2.

A thread hole 21f for a bolt and a bolt insertion hole 22f are provided as a pair, and this pair is provided to on left and right sides. In FIG. 2, the crankshaft bearing 28 is provided between the pairs and has the bearing metal 29. The bearing metal 29 has a split structure in a cylindrical shape, including a first semicircular part 29a and a second semicircular part 29b. Each of the upper and lower vertical walls 21c and 22c is formed with a semicircular notched portion at its joining part to the other vertical wall, and the first semicircular part 29a of the bearing metal 29 is attached to the notched portion of the upper vertical wall 21c and the second semicircular part 29b of the bearing metal 29 is attached to the notched portion of the lower vertical wall 22c. By coupling the upper vertical wall 21c to the lower vertical wall 22c, the first semicircular part 29a is coupled to the second semicircular part 29b and, thus, the cylindrical bearing metal 29 is formed.

An inner circumferential surface of the first semicircular part 29a is formed with an oil groove 29c extending in a circumferential direction of the first semicircular part 29a. A communicating path 29d is formed to open to an outer circumferential surface of the first semicircular part 29a at one end, and extends through the first semicircular part 29a to open to the oil groove 29c at the other end. The upper block 21 is formed with the oil supply path 5 (see FIG. 4: specifically, a main gallery 50), and the oil is supplied to the outer circumferential surface of the first semicircular part 29a via the oil supply path 5 (50). The communicating path 29d is disposed at a position communicating with the oil supply path, and thus, the oil supplied from the oil supply path flows into the oil groove 29c via the communicating path 29d.

Note that, although not illustrated, a chain cover is attached to the front wall of the cylinder block 2. A drive sprocket coupled to the crankshaft 26, a timing chain wound around the drive sprocket, an oil pressure chain tensioner (hydraulically-operated device) for applying tension to the timing chain, etc., are accommodated inside the chain cover.

Figure 3:
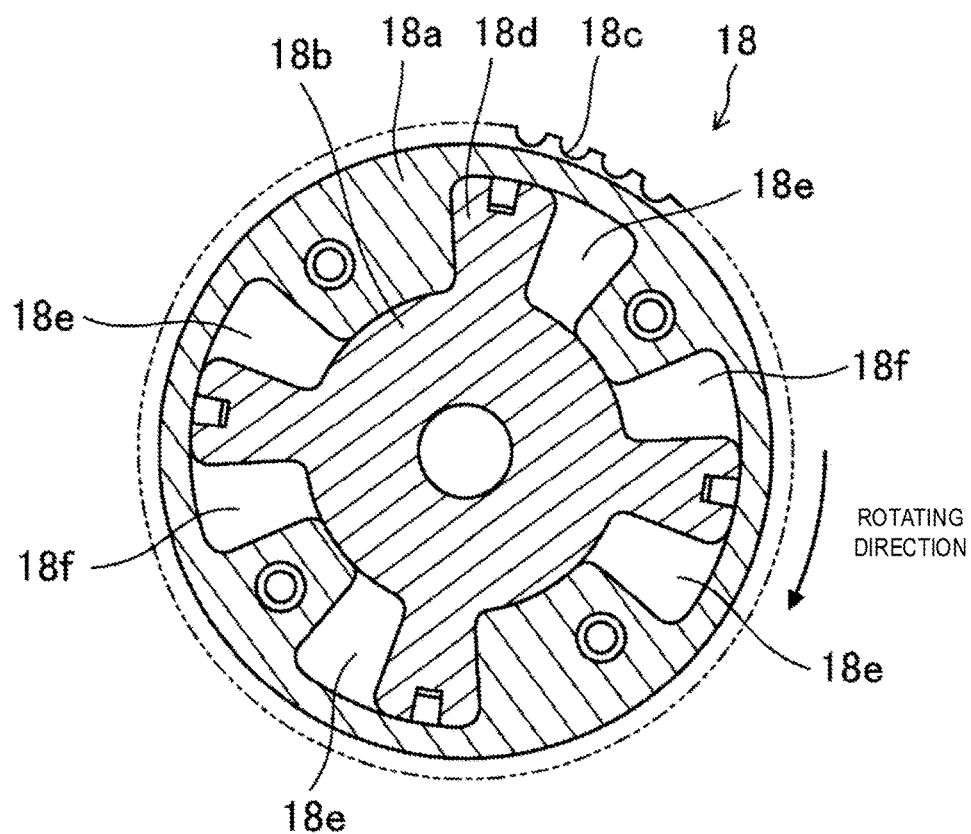
FIG. 3 is a cross-sectional view illustrating a schematic configuration of an exhaust variable valve timing mechanism of the engine.

The engine 100 includes intake and exhaust variable valve timing mechanisms (VVTs) for changing characteristics of the intake and exhaust valves 13 and 14, respectively. The intake VVT is electrically operated, and the exhaust VVT 18 (hydraulically-operated device) is operated with oil pressure. As illustrated in FIG. 3, the exhaust VVT 18 has a substantially-annular housing 18a and a rotor 18b accommodated inside the housing 18a. The housing 18a is coupled to be integrally rotatable with a cam pulley 18c for rotating in a direction indicated by the arrow in FIG. 3 (clockwise direction in FIG. 3) in synchronization with the crankshaft 26. The rotor 18b is coupled to be integrally rotatable with the exhaust camshaft 42 for opening and closing the exhaust valves 14.

Vanes 18d which slide on an inner circumferential surface of the housing 18a are provided to the rotor 18b. A plurality of retard-side oil pressure chambers 18e and a plurality of advance-side oil pressure chambers 18f are formed inside the housing 18a. Each of the retard-side and advance-side oil pressure chambers 18e and 18f is defined by the inner circumferential surface of the housing 18a, one of the vanes 18d, and a main body of the rotor 18b. The oil is supplied to the retard-side and advance-side oil pressure chambers 18e and 18f.

When the oil pressure of the retard-side oil pressure chamber 18e increases, the rotor 18b shifts in position to an opposite side from the rotating direction of the housing 18a (counter-clockwise direction in FIG. 3). Therefore, the exhaust camshaft 42 shifts in position to the opposite side from the rotational direction of the cam pulley 18c, and an opening timing of each exhaust valve 14 becomes later (is retarded). On the other hand, when the oil pressure of the advance-side oil pressure chamber 18f increases, the rotor 18b shifts in position in the rotating direction of the housing 18a (clockwise direction in FIG. 3). Therefore, the exhaust camshaft 42 shifts in position to the same side as the rotational direction of the cam pulley 18c, and the opening timing of each exhaust valve 14 becomes earlier (is advanced).

Figure 4:
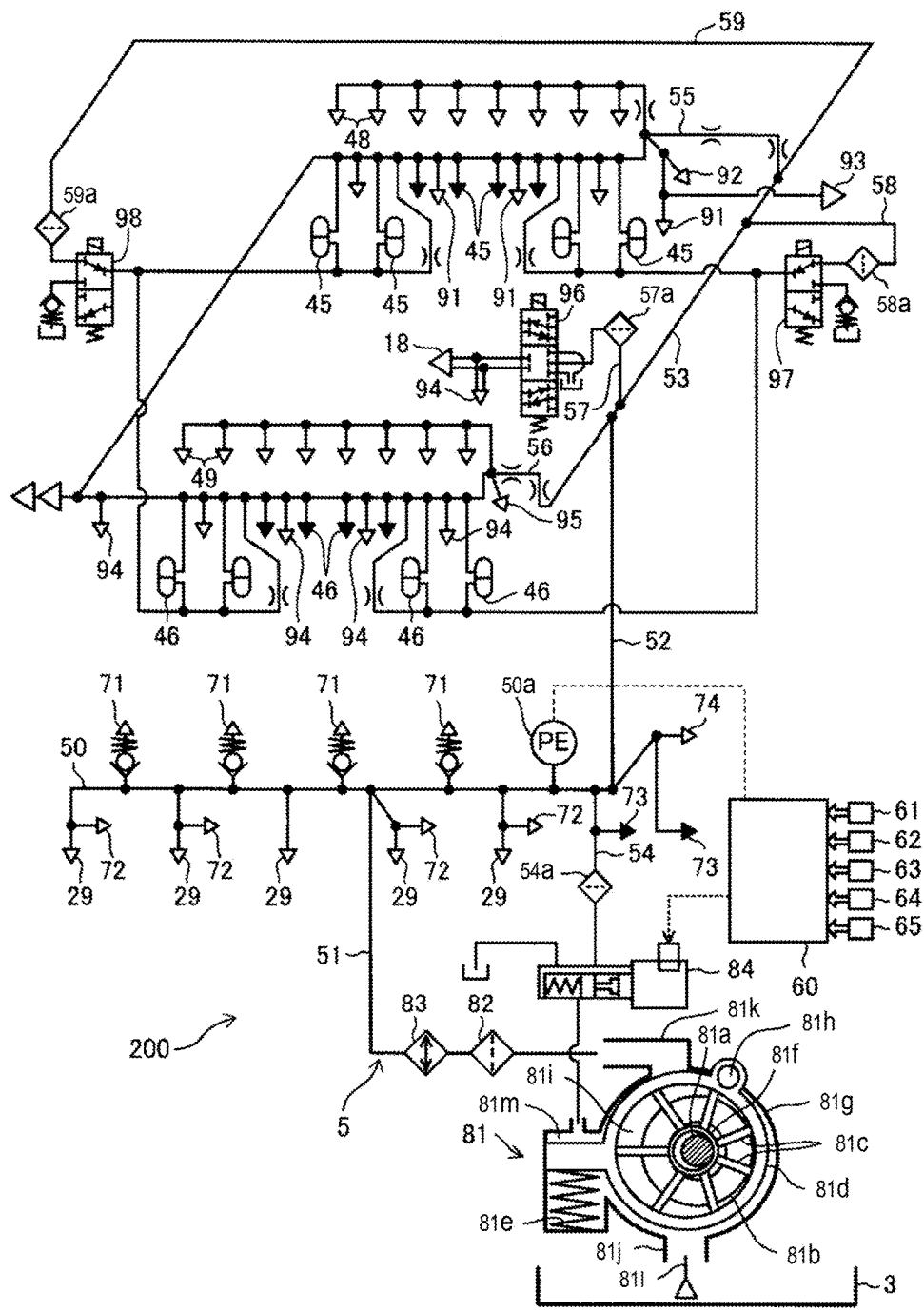
FIG. 4 is an oil pressure circuit diagram of an oil supply system of the engine.

Next, an oil supply system 200 is described with reference to FIG. 4. FIG. 4 is an oil pressure circuit diagram of the oil supply system 200 of the engine 100.

The oil supply system 200 includes the variable displacement oil pump 81 as an auxiliary device for being rotationally driven by the crankshaft 26 of the engine 100, and the oil supply path 5 connected with the oil pump 81 and through which the oil flows.

The oil pump 81 is attached to a lower surface of the lower block 22 and accommodated inside the oil pan 3. The oil pump 81 includes a drive shaft 81a for being rotationally driven by the crankshaft 26, a rotor 81b coupled to the drive shaft 81a, a plurality of vanes 81c provided to be able to project and retreat from the rotor 81b in a radial direction thereof, a cam ring 81d accommodating the rotor 81b and the vanes 81c and of which eccentric amount from a center of rotation of the rotor 81b is adjustable, a spring 81e biasing the cam ring 81d to a direction in which the eccentric amount from the center of rotation of the rotor 81b increases, a ring member 81f disposed inward of the rotor 81b, and a housing 81g accommodating the rotor 81b, the vanes 81c, the cam ring 81d, the spring 81e, and the ring member 81f.

Although not illustrated, a front end part of the drive shaft 81a projects outward of the housing 81g and is coupled to a slave sprocket. The timing chain is wound around the slave sprocket. The timing chain is the above-described timing chain accommodated inside the chain cover and wound around the drive sprocket of the crankshaft 26. In other words, the drive shaft 81a and the rotor 81b are rotationally driven by the crankshaft 26 via the timing chain.

While the rotor 81b rotates, the vanes 81c constantly slide on an inner circumferential surface of the cam ring 81d. In other words, a plurality of pump chambers 81i are provided and each of the plurality of pump chambers 81i is defined by the rotor 81b, adjacent two vanes 81c, the cam ring 81d, and the housing 81g. The housing 81g is formed with a suction port 81j through which the oil is sucked into the pump chambers 81i, and a discharge port 81k through which the oil is discharged from the pump chambers 81i. An oil strainer 81l is connected with the suction port 81j. The oil strainer 81l is soaked in the oil stored in the oil pan 3. The oil stored in the oil pan 3 is sucked into the pump chambers 81i from the suction port 81j via the oil strainer 81l. The oil supply path 5 (specifically, a first communicating path 51) is connected with the discharge port 81k. The oil pumped by the oil pump 81 is discharged from the discharge port 81k to the oil supply path 5 (51).

The cam ring 81d is supported by the housing 81g to be swingable centering on a predetermined fulcrum 81h. The spring 81e biases the cam ring 81d to one side of the swing motion centering on the fulcrum 81h (clockwise side in FIG. 4). A pressure chamber 81m is defined between the cam ring 81d and the housing 81g. The oil is supplied to the pressure chamber 81m from outside (specifically, from a control oil supply path 54 via an oil control valve 84). The oil pressure of the pressure chamber 81m biases the cam ring 81d to the other side of the swing motion centering on the fulcrum 81h (counter-clockwise side in FIG. 4). The cam ring 81d swings corresponding to a balance between the biasing force of the spring 81e and the oil pressure of the pressure chamber 81m, and thus, the eccentric amount of the cam ring 81d with respect to the center of rotation of the rotor 81b is determined. The volume of the oil pump 81 changes corresponding to the eccentric amount of the cam ring 81d and, thus, the discharge amount of oil (discharge pressure) is adjusted.

The oil supply path 5 is specifically made of a pipe member, flow paths drilled in walls of the cylinder head 1 and the cylinder block 2, etc. The oil supply path 5 includes the main gallery 50 extending in the cylinder block 2 in the cylinder-line directions (see FIG. 1), the first communicating path 51 connecting the oil pump 81 with the main gallery 50, a second communicating path 52 extending from the main gallery 50 to the cylinder head 1, a third communicating path 53 extending in the cylinder head 1 between the intake and exhaust sides in a substantially horizontal direction, the control oil supply path 54 branching from the main gallery 50, and first to fifth oil supply paths 55 to 59 branching from the third communicating path 53.

The first communicating path 51 is connected with the discharge port 81k of the oil pump 81. An oil filter 82 and an oil cooler 83 (see FIG. 1) are provided in the first communicating path 51 in this order from the oil pump 81 side. The oil discharged from the oil pump 81 to the first communicating path 51 is filtered at the oil filter 82, is adjusted in temperature at the oil cooler 83, and then flows into the main gallery 50.

The main gallery 50 is connected to four oil jets 71 (hydraulically-operated devices) for injecting the oil toward bottom surfaces of the respective pistons 24 (see FIG. 1), five bearing metals 29 of the crankshaft bearings 28 rotatably supporting the journals of the crankshaft 26, four bearing metals 72 (to-be-lubricated parts) disposed to crankpins to which larger end parts of the respective connecting rods 25 are rotatably coupled, an oil supplying part 73 for supplying the oil to the oil-pressure chain tensioner, an oil jet 74 (hydraulically-operated device) for injecting the oil to the timing chain, and an oil-pressure sensor 50a (may also be referred to as the "discharge pressure detector") for detecting the oil pressure of the oil flowing through the main gallery 50 (i.e., the discharge pressure of the oil pump 81). The oil is constantly supplied to the main gallery 50. Each oil jet 71 has a one-way valve and a nozzle, and when an oil pressure above a predetermined value is applied thereto, opens the one-way valve and injects the oil from the nozzle.

The main gallery 50 branches into the control oil supply path 54 connected with the pressure chamber 81m of the oil pump 81 via the oil control valve 84. An oil filter 54a is provided in the control oil supply path 54. The oil inside the main gallery 50 passes through the control oil supply path 54, is adjusted in pressure by the oil control valve 84, and then flows into the pressure chamber 81m of the oil pump 81. The oil pressure of the pressure chamber 81m is adjusted by the oil control valve 84. The oil control valve 84 is structured by a linear solenoid valve and adjusts a flow rate of the oil to be supplied to the pressure chamber 81m based on a duty ratio of a control signal inputted from a controller 60.

The second communicating path 52 communicates the main gallery 50 with the third communicating path 53. The oil flowing through the main gallery 50 passes through the second communicating path 52 and flows into the third communicating path 53. The oil flowed into the third communicating path 53 is distributed to the intake and exhaust sides of the cylinder head 1.

The first oil supply path 55 branched from the third communicating path 53 is connected with oil receiving parts 91 of the bearing metals rotatably supporting the journals of the intake camshaft 41, an oil receiving part 92 of a thrust bearing (to-be-lubricated part) of the intake camshaft 41, the intake HLAs 45 of the second and third cylinders, the intake oil showers 48, and an oil receiving part 93 of a sliding part (to-be-lubricated part) of the intake VVT.

The second oil supply path 56 branched from the third communicating path 53 is connected with oil receiving parts 94 of the bearing metals rotatably supporting the journals of the exhaust camshaft 42, an oil receiving part 95 of a thrust bearing (to-be-lubricated part) of the exhaust camshaft 42, the exhaust HLAs 46 of the second and third cylinders, and the exhaust oil showers 49.

The third oil supply path 57 branched from the third communicating path 53 is connected with the retard-side and advance-side oil pressure chambers 18e and 18f (see FIG. 3) of the exhaust VVT 18 via a first direction-switch valve 96. The third oil supply path 57 is connected with a front-most oil receiving part 94 among the oil receiving parts 94 of the bearing metals of the exhaust camshaft 42. An oil filter 57a is connected with the third oil supply path 57 at a position upstream of the first direction-switch valve 96. Flow rates of the oil to be supplied to the retard-side and advance-side oil pressure chambers 18e and 18f are adjusted by the first direction-switch valve 96.

The fourth oil supply path 58 branched from the third communicating path 53 is connected with the intake and exhaust HLAs 45 and 46 of the first cylinder via a second direction-switch valve 97. An oil filter 58a is connected with the fourth oil supply path 58 at a position upstream of the second direction-switch valve 97. The oil supply to the intake and exhaust HLAs 45 and 46 of the first cylinder is controlled by the second direction-switch valve 97.

The fifth oil supply path 59 branched from the third communicating path 53 is connected with the intake and exhaust HLAs 45 and 46 of the fourth cylinder via a third direction-switch valve 98. An oil filter 59a is connected with the fifth oil supply path 59 at a position upstream of the third direction-switch valve 98. The oil supply to the intake and exhaust HLAs 45 and 46 of the fourth cylinder is controlled by the third direction-switch valve 98.

As described above, the oil supplied to the respective parts of the engine 100 via the oil supply path 5 of the oil supply system 200 passes through a drain oil path (not illustrated) to drop onto the oil pan 3, and then is recirculated to the respective parts of the engine 100 by the oil pump 81. In the above description, the hydraulically-operated devices include the devices of the reference characters 18, 45, 46, 71, and 74 and the oil-pressure chain tensioner, and the to-be-lubricated parts include the devices of the reference characters 29, 48, 49, and 72, the bearing metals of the camshafts 41 and 42, the thrust bearings of the camshafts 41 and 42, and the sliding part of the intake VVT.

The engine 100 is controlled by the controller (may be referred to as the "oil pressure controller") 60. The controller 60 is comprised of a well-known microcomputer, and includes a central processing unit (CPU) for executing program(s), a memory comprised of, for example, a RAM and/or a ROM for storing the program(s) and data, and an input/output (I/O) bus for inputting and outputting electric signals.

The controller 60 receives detection signals from various sensors for detecting an operating state of the engine 100. For example, the controller 60 is electrically connected with the oil pressure sensor 50a provided on the main gallery 50, a crank angle sensor 61 for detecting a rotational angle of the crankshaft 26, an airflow sensor (may also be referred to as the "load detector") 62 for detecting an amount of air sucked into the engine 100, an oil temperature sensor (may also be referred to as the "oil temperature detector") 63 for detecting a temperature of the oil, a cam angle sensor 64 for detecting rotational phases of the camshafts 41 and 42, a water temperature sensor 65 for detecting a temperature of cooling water of the engine 100, etc. The controller 60 obtains an engine speed based on the detection signal of the crank angle sensor 61, obtains an engine load based on the detection signal of the airflow sensor 62, and obtains an oil temperature based on the detection signal of the oil temperature sensor 63.

The controller 60 determines the operating state of the engine 100 based on the various detection signals, and controls the oil control valve 84, the first to third direction-switch valves 96 to 98 according to the determined operating state. Particularly, the controller 60 performs a discharge amount control (discharge pressure control) of the variable displacement oil pump 81 according to the operating state of the engine 100. Specifically, the controller 60 sets a target oil pressure according to the operating state of the engine 100, and controls the variable displacement oil pump 81 via the oil control valve 84 to adjust the oil pressure detected by the oil pressure sensor 50a (the discharge pressure of the oil pump 81) to reach the target oil pressure.

Next, setting of the target oil pressure is described.

With the oil supply system 200 of this embodiment, the oil is supplied to the plurality of hydraulically-operated devices by the single oil pump 81. Oil pressures required by the respective hydraulically-operated devices change according to the operating state of the engine 100. Therefore, to obtain the oil pressure required by all the hydraulically-operated devices in any operating state of the engine 100, the controller 60 needs to set, for every operating state of the engine 100, an oil pressure even higher than the highest pressure among the required oil pressures of the respective hydraulically-operated devices, to be the target oil pressure. In this embodiment, the exhaust VVT 18, the oil jets 71, etc., are the hydraulically-operated devices with comparatively high required oil pressure. Therefore, by setting the target oil pressure to satisfy the required oil pressures of these hydraulically-operated devices, the required oil pressures of hydraulically-operated devices with comparative low required oil pressure can also be satisfied.

Similarly, the oil pressures required by the respective to-be-lubricated parts also change according to the operating state of the engine 100. In this embodiment, the bearing metals 29 of the crank bearings 28, etc., are the to-belubricated parts with comparatively high required oil pressure. Therefore, by setting the target oil pressure to satisfy the required oil pressures of these to-be-lubricated parts, the required oil pressures of to-be-lubricated parts with comparative low required oil pressure can also be satisfied.

The controller 60 sets an oil pressure slightly higher than the required oil pressure of the bearing metal 29 of each crank bearing 28, to be a base oil pressure P1 required for a basic operation of the engine 100 when the hydraulically-operated devices are not in operation. In other words, the base oil pressure P1 is set to satisfy the required oil pressures of all the to-be-lubricated parts.

The controller 60 compares the base oil pressure P1, required oil pressures P2 for operating the respective hydraulically-operated devices, and further an oil pressure P3 for improving the atmospheric lubrication (i.e., improving the generation of oil mist) with each other, and sets a highest oil pressure thereamong to be the target oil pressure. All of the base oil pressure P1, the required oil pressures P2 of the hydraulically-operated devices, and the oil pressure P3 for the atmospheric lubrication improvement change according to the engine operating state (e.g., the engine load, the engine speed, and the oil temperature). Therefore, the controller 60 stores in the memory a map including the base oil pressure P1 experimentally designed before use according to the engine load, the engine speed, and the oil temperature, maps including the required oil pressures P2 of the hydraulically-operated devices, and a map including the oil pressure P3 for the atmospheric lubrication improvement.

Specifically, FIG. 5 illustrates the base oil pressure map (may also be referred to as the "base oil pressure memory"), FIG. 6 illustrates the atmospheric lubrication improving oil pressure map (may also be referred to as the "first memory"), FIG. 7 illustrates the required oil pressure map for each oil jet 71 (may also be referred to as the "second memory"), and FIG. 8 illustrates the required oil pressure map for the exhaust VVT 18 (may also be referred to as the "second memory"). In each map, "oil pressure" is stored for every "operating state" (e.g., a vehicle speed and an operation state of an accelerator pedal (accelerator), not the engine operating state), "engine load" ("load" in the map), "oil temperature" ("oil temp" in the map), and "engine speed" ("speed" in the map). The unit of oil temperature is ° C., the unit of engine speed is rpm, and the unit of oil pressure is kPa. FIGS. 5 to 8 illustrate excerpted parts of the maps, respectively. In other words, the oil pressure may be set by segmentalizing each of the operating state, the engine load, the oil temperature, and the engine speed. Further, the oil pressure is set discretely according to the engine speed, etc. Therefore, the oil pressure for an engine speed, etc., that is not stored in the map may be obtained by linearly interpolating the oil pressures stored in the map.

The base oil pressure map in FIG. 5 stores the base oil pressure P1 set according to the engine speed at a predetermined oil temperature T after warming up the engine.

Since the base oil pressure P1 is an oil pressure required for the basic operation of the engine 100 when the hydraulically-operated devices are not in operation, as illustrated in FIG. 5, a particular condition (the operating state, the engine load, the oil temperature, and the engine speed) in which the base oil pressure P1 is applied is not defined. Since the to-be-lubricated parts (e.g., the bearing metals 29) need to be lubricated more as the engine speed increases, the base oil pressure P1 is set higher as the engine speed increases.

Note that within a medium engine speed range, the base oil pressure P1 is set to a substantially fixed value (200 kPa in FIG. 5).

The atmospheric lubrication improving oil pressure map of FIG. 6 stores the atmospheric lubrication improving oil pressure P3 set to increase the discharge amount of the variable displacement oil pump 81 as the oil temperature (Ta1>Ta2>Ta3>Ta4) becomes lower during the idle operation in which the accelerator is fully closed.

A request for an atmospheric lubrication improvement (an oil mist generation improvement) is mainly issued when the engine load is low (e.g., during the idle operation). When the engine load is low, the required oil pressures of the hydraulically-operated devices are set low, and accordingly, the target oil pressure of the oil pump 81 is also set low so as to suppress the drive force of the oil pump 81 to a necessary minimum level. Thus, the discharge amount of the oil pump 81 is reduced, which causes reduction of the generation amount of oil mist. Therefore, the atmospheric lubrication by the oil mist becomes insufficient. Specifically, the formation of the lubricating oil films by the oil mist on the sliding surfaces of the drive force transmission system members (the pin boss, the piston pin and the smaller end part of the connecting rod 25 of the piston 24) for transmitting the drive force according to the combustion, or a formation of the lubricating oil film between sliding surfaces of a piston skirt and a cylinder liner by the oil mist, etc., becomes insufficient. As a result, engine noise increases when the piston operates.

In particular, such issues become more severe when the engine load is low in a warming-up operation of the engine 100, since when the engine 100 is in the warming-up operation state, the discharge amount is adjusted to achieve the required oil pressure according to the engine operating state, and the drive force of the variable displacement oil pump 81 is suppressed to the necessary minimum level.

Therefore, when the engine load is low (e.g., during the idle operation), particularly when the engine load is low in the warming-up operation state of the engine 100, upon the request for the atmospheric lubrication improvement, the discharge amount of the oil pump 81 is increased as the oil temperature becomes lower, so as to increase the generation amount of oil mist. In other words, as illustrated in FIG. 6, the request of the atmospheric lubrication improvement is issued when a vehicle speed is low (3 km/h or below in FIG. 6) and during the idle operation in which the accelerator is fully closed (in other words, the air amount detected by the airflow sensor 62 (i.e., engine load) is as extremely low as substantially zero). Since the request of the atmospheric lubrication improvement is issued in such an operating state, the atmospheric lubrication improving oil pressure P3 is set only for comparatively low engine speeds (500 and 700 rpm in FIG. 6). The atmospheric lubrication improving oil pressure P3 is set higher as the oil temperature becomes lower since the viscosity of oil increases and the generation amount of oil mist reduces as the oil temperature becomes lower.

Note that although the atmospheric lubrication improving oil pressure P3 is fixed regardless of the engine speed in FIG. 6, it may change according to the engine speed. For example, the atmospheric lubrication improving oil pressure P3 may be set higher as the engine speed increases (e.g., at 700 rpm, the oil pressure P3 may be set to be 110, 130, 170, and 210 kPa from the top in FIG. 6).

The required oil pressure map for the oil jet 71 in FIG. 7 stores the required oil pressure P2 of the oil jet 71 set according to the engine operating state.

Each oil jet 71, as described above, has the one-way valve and the nozzle, and when the oil pressure above the predetermined value is applied thereto, opens the one-way valve and injects the oil from the nozzle. Therefore, as illustrated in FIG. 7, the required oil pressure P2 of the oil jet 71 is fixed (350 kPa in FIG. 7) even when the engine speed changes (Va2>Va1) and/or the engine load changes (P1>P2).

The required oil pressure map for the exhaust VVT 18 in FIG. 8 stores the required oil pressure P2 of the exhaust VVT 18 set according to the engine operating state.

Specifically, as illustrated in FIG. 8, the required oil pressure P2 of the exhaust VVT 18 is set higher as the engine speed increases and as the oil temperature (Tb1>Tb2>Tb3) becomes lower.

Note that within a low engine speed range (e.g., a range includes 500 or 700 rpm (500 rpm in FIG. 8)), the required oil pressure P2 of the exhaust VVT 18 is set to zero. Since the low engine speed range corresponds to the engine speed at which the request for the atmospheric lubrication improvement is issued, a large part of the discharge amount of the variable displacement oil pump 81 which has already been increased using the atmospheric lubrication improving oil pressure map of FIG. 6 would flow to the exhaust VVT 18 and be consumed. Therefore, the operation of the exhaust VVT 18 is restricted to suppress such consumption. Thus, the oil mist generation improvement is stimulated.

Figure 9:
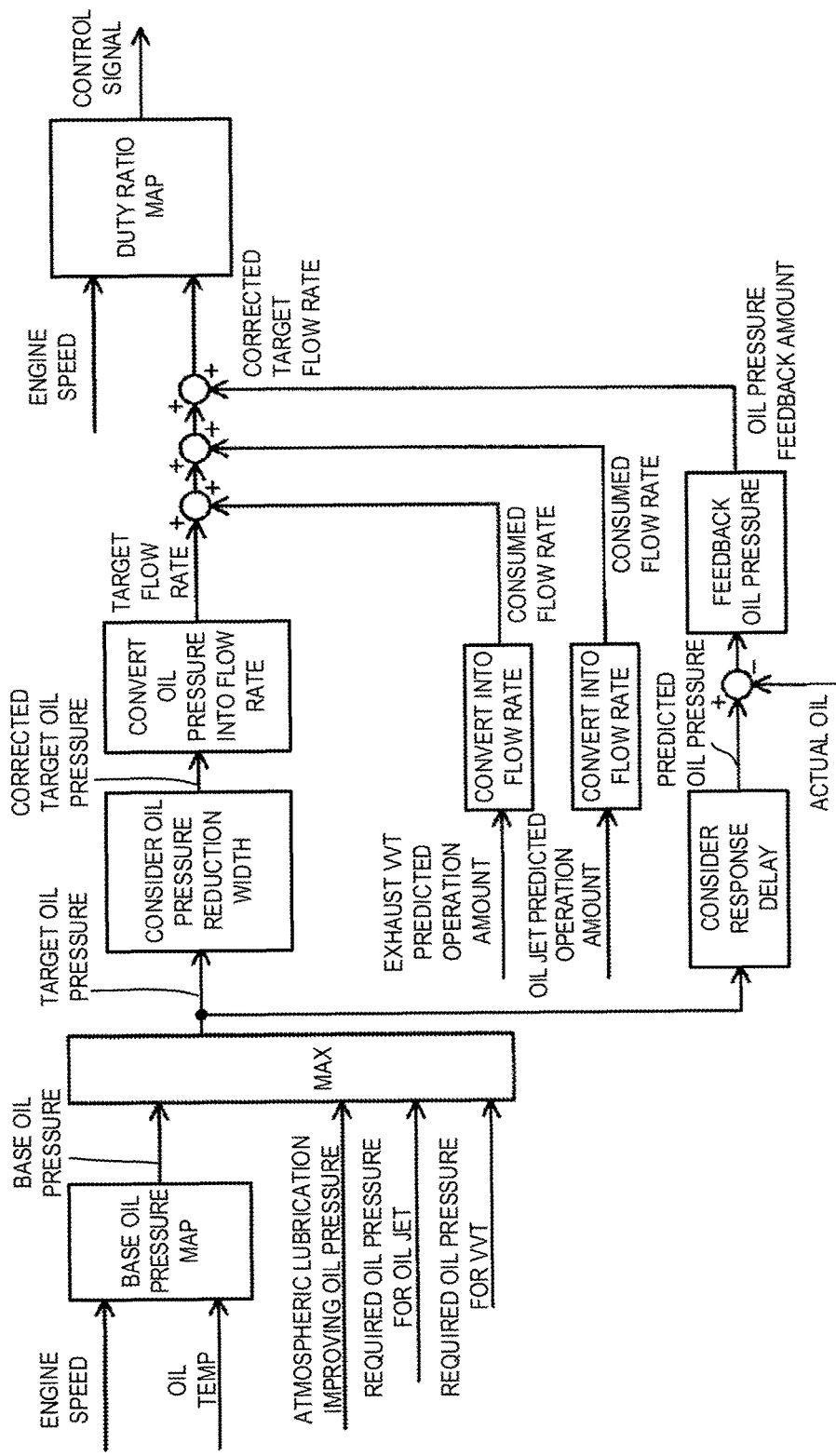
FIG. 9 is a block diagram of a discharge amount control of a variable displacement oil pump performed by a controller of the oil supply system.

Next, a flow of the signal in the discharge amount control of the oil pump 81 is described with reference to FIG. 9.

The controller 60 obtains the base oil pressure P1 by comparing the engine speed and the oil temperature which are detected by the various sensors with the base oil pressure map. Additionally, the controller 60 receives the required oil pressures P2 of the hydraulically-operated devices and the atmospheric lubrication improving oil pressure P3, and sets a highest oil pressure among the base oil pressure P1, the required oil pressure P2, and the improving oil pressure P3 to be the target oil pressure. Depending on the operating state of the engine 100, there is a case where a plurality of required oil pressures P2 and a plurality of improving oil pressures P3 exist. Note that when the required oil pressure P2 and the improving oil pressure P3 do not exist, the controller 60 sets the base oil pressure P1 to be the target oil pressure. The controller 60 which performs such operations may be referred to as the "setting module."

From a different perspective, the base oil pressure P1 is a temporal target oil pressure, and when the required oil pressures P2 of the hydraulically-operated devices and the atmospheric lubrication improving oil pressure P3 exist and the oil pressures P2 and P3 are higher than the base oil pressure P1, one of the oil pressures P2 and P3 is set to be the target oil pressure.

Note that according to FIGS. 5 to 8 described above, when the accelerator is fully closed and the engine load is low within the low engine speed range including 500 and 700 rpm (during the idle operation), since the atmospheric lubrication improving oil pressure P3 in FIG. 6 is higher than the base oil pressure P1 in FIG. 5 and the oil pressure P2 of the exhaust VVT 18 in FIG. 8, the atmospheric lubrication improving oil pressure P3 is set to be the target oil pressure (the required oil pressure P2 of the oil jet 71 in FIG. 7 is not set for the low engine speed range).

Next, the controller 60 increases the target oil pressure based on an oil pressure reduction width when the oil flows from the oil pump 81 to the position of the oil pressure sensor 50a, and calculates a corrected target oil pressure. The oil pressure reduction width is stored in the memory before use. The controller 60 converts the corrected target oil pressure into a flow rate (discharge amount, further discharge pressure) of the oil pump 81 to obtain a target flow rate (target discharge amount, further target discharge pressure).

Subsequently, the controller 60 corrects the target flow rate. Specifically, the controller 60 converts a predicted operation amount of the exhaust VVT 18 when the exhaust VVT 18 is operated into a flow rate to obtain a consumed flow rate in the operation of the exhaust VVT 18. The predicted operation amount of the exhaust VVT 18 can be obtained based on a difference between a current operational angle and a target operational angle of the exhaust VVT 18, and the engine speed. Further, the controller 60 obtains a consumed flow rate in the operation of the oil jets 71. The controller 60 obtains a consumed flow rate corresponding to the hydraulically-operated device(s) to be operated, and corrects the above-described target flow rate by using this consumed flow rate.

In the basic operation of the engine 100, since the predicted operation amount of each hydraulically-operated device is zero (0), the target oil pressure is not corrected according to the operation of the hydraulically-operated device(s). On the other hand, in a transition operation of the engine 100, the target oil pressure is corrected according to the hydraulically-operated device(s) to be operated. In other words, the discharge amount (discharge pressure) of the oil pump 81 is corrected.

Further, the controller 60 corrects the target flow rate based on an oil pressure feedback amount. The oil pressure feedback amount is a value obtained according to a deviation between a predicted oil pressure and an actual oil pressure. The actual oil pressure is an oil pressure detected by the oil pressure sensor 50a. The predetermined oil pressure is a prediction of a change of the actual oil pressure when the target oil pressure is changed. When the actual oil pressure is higher than the predicted oil pressure, the oil pressure feedback amount becomes a negative value and the target flow rate is reduced. On the other hand, when the actual oil pressure is lower than the predicted oil pressure, the oil pressure feedback amount becomes a positive value and the target flow rate is increased. When the actual oil pressure is the same as the predicted oil pressure, the oil pressure feedback amount becomes zero, in other words, the correction based on the oil pressure feedback amount is not performed.

In the transition operation of the engine 100, when the target oil pressure is changed in a stepwise fashion, due to a response delay of the oil pressure (including a response delay of the oil pump 81 and a response delay for the oil pressure to reach the position of the oil pressure sensor 50a from the oil pump 81), the actual oil pressure follows the change of the target oil pressure with a delay. Such a change of the actual oil pressure with the response delay of the oil pressure can be predicted based on a dead time and a time constant determined through experiment(s) before use, and the predicted oil pressure thus obtained is applied. Note that in a normal operation of the oil pump 81, the predicted oil pressure becomes the same as the target oil pressure, in other words, a control substantially the same as an oil pressure feedback control in which a deviation between the target oil pressure and the actual oil pressure is fed back is performed.

When the deviation between the target oil pressure and the actual oil pressure is fed back, due to the response delay of the oil pressure, the deviation between the target oil pressure and the actual oil pressure immediately after the target oil pressure is changed becomes excessively large, and an overshoot or undershoot of the actual oil pressure with respect to the target oil pressure easily occurs. Particularly when the oil pump 81 deteriorates, the deviation becomes even larger. In this regard, the deviation between the predicted oil pressure and the actual oil pressure is generally small, and since the actual oil pressure is changed substantially corresponding to the predicted oil pressure by feeding back the deviation between the predicted oil pressure and the actual oil pressure, the overshoot or undershoot of the actual oil pressure with respect to the target oil pressure does not occur easily. As a result, the actual oil pressure can smoothly be matched with the target oil pressure. Further, even if the deviation between the target oil pressure and the actual oil pressure immediately after the target oil pressure is changed increases to a certain level due to the deterioration of the oil pump 81, since the actual oil pressure is changed substantially corresponding to the predicted oil pressure, the overshoot or undershoot of the actual oil pressure with respect to the target oil pressure does not occur easily.

The controller 60 sets a target duty ratio by comparing with a duty ratio map the target flow rate corrected as above and the engine speed, and transmits a control signal indicating the target duty ratio to the oil control valve 84.

Figure 10:
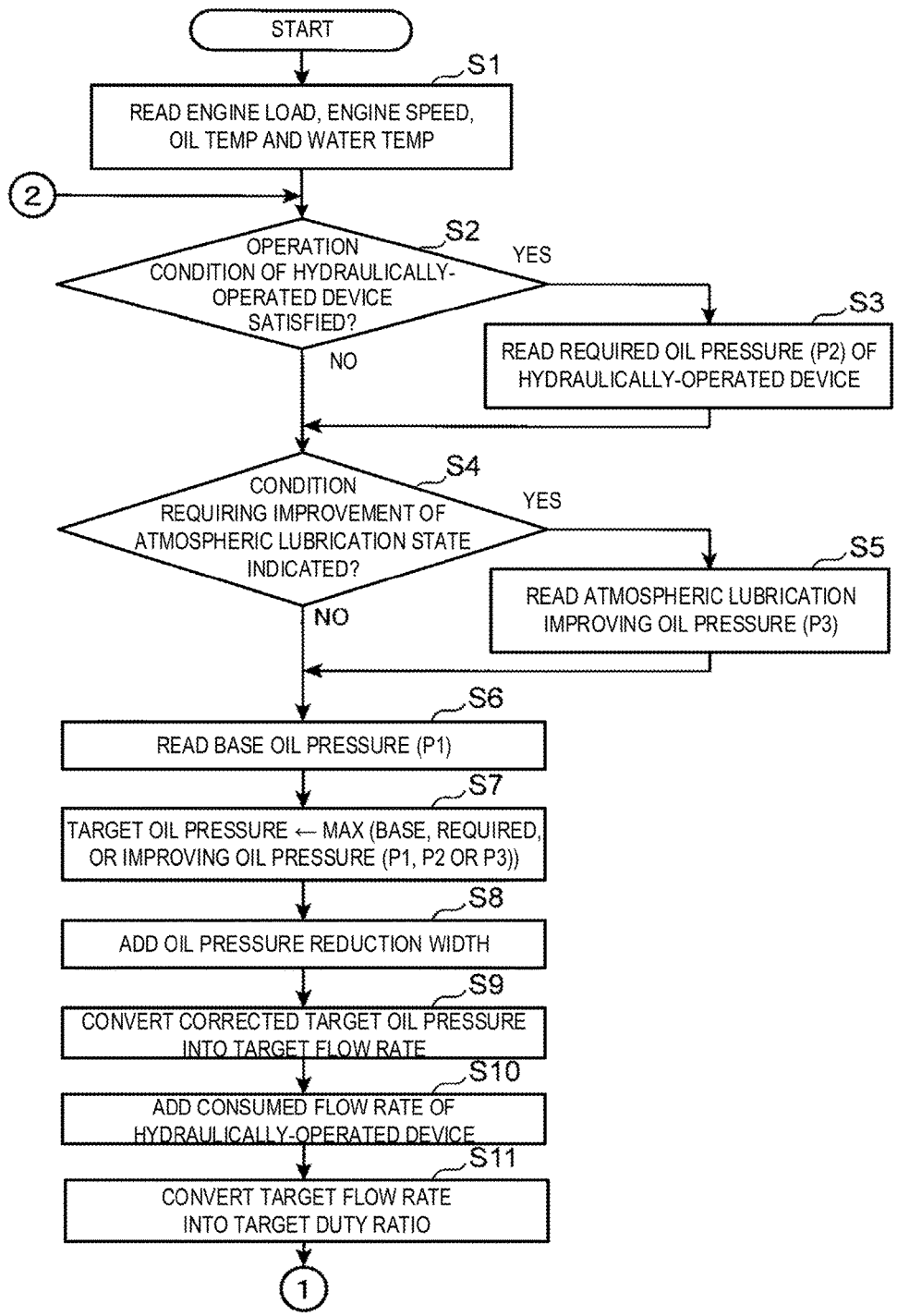
FIG. 10 is an early half of a flowchart of the discharge amount control of the variable displacement oil pump performed by the controller.
Figure 11:
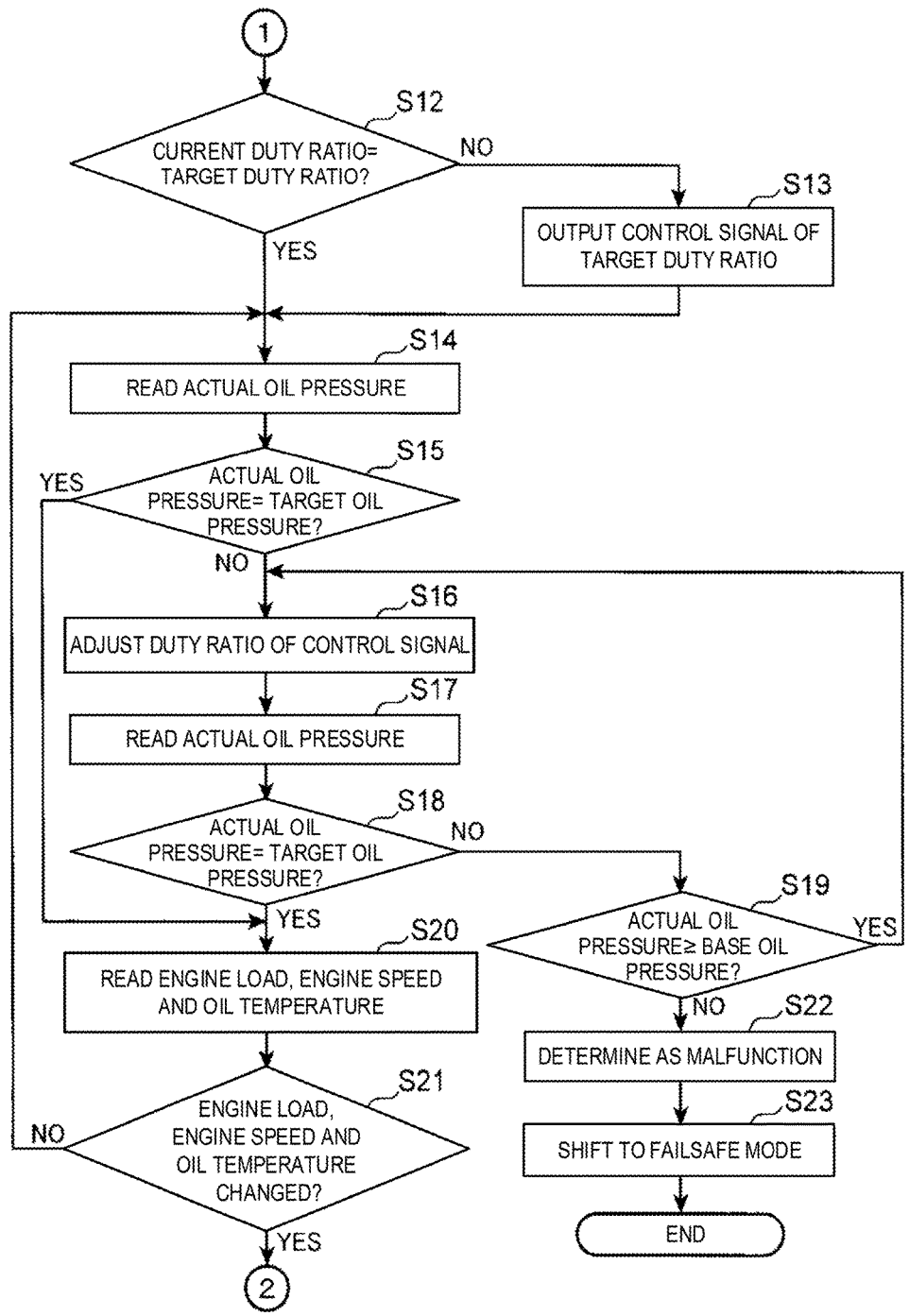
FIG. 11 is a latter half of the flowchart.

Next, the discharge amount control (discharge pressure control) of the oil pump 81 by the controller 60 is described by referring to flowcharts of FIGS. 10 and 11.

At S1, the controller 60 reads the engine load, the engine speed, the oil temperature, and the water temperature, and at S2, the controller 60 determines whether an operation condition of one of the hydraulically-operated devices is satisfied for each of the hydraulically-operated devices based on the read parameters.

If the operation condition of the hydraulically-operated device is not satisfied, the controller 60 proceeds to S4. On the other hand, if the operation condition of the hydraulically-operated device is satisfied, at S3, the controller 60 reads the required oil pressure(s) P2 corresponding to the hydraulically-operated device(s) of which operation condition is satisfied, from the required oil pressure map (e.g., FIG. 7 or FIG. 8). Then the controller 60 proceeds to S4.

At S4, based on the parameters read at S1, the controller 60 determines whether the parameters indicate a condition in which the improvement of the atmospheric lubrication state (the oil mist generation improvement) is required.

If the condition in which the improvement of the atmospheric lubrication state is required is not indicated, the controller 60 proceeds to S6. On the other hand, if the condition in which the improvement of the atmospheric lubrication state is required is indicated, at S5, the controller 60 reads the atmospheric lubrication improving oil pressure P3 from the atmospheric lubrication improving oil pressure map in FIG. 6. Then the controller 60 proceeds to S6.

At S6, the controller 60 obtains the base oil pressure P1 corresponding to the engine speed and the oil temperature based on the base oil pressure map in FIG. 5.

Then, at S7, the controller 60 compares the base oil pressure P1, the required oil pressure(s) P2, and the improving oil pressure P3 with each other, and sets a highest oil pressure thereamong to be the target oil pressure. Note that when the required oil pressure(s) P2 and the improving oil pressure P3 do not exist, the controller 60 sets the base oil pressure P1 to be the target oil pressure. The controller 60 which performs the processing at S7 may be referred to as the "setting module."

Note that as is apparent from FIGS. 5 to 8, when the accelerator is fully closed and the engine load is low within the low engine speed range (during the idle operation) including 500 and 700 rpm, the controller 60 sets the atmospheric lubrication improving oil pressure P3 in FIG. 6 to be the target oil pressure as described above.

Next, at S8, the controller 60 adds the oil pressure reduction width to the target oil pressure to calculate the corrected target oil pressure, and then at S9, the controller 60 converts the corrected target oil pressure into a flow rate to obtain the target flow rate (target discharge amount, further target discharge pressure). Further, at S10, the controller 60 corrects the target flow rate according to the hydraulically-operated device(s) to be operated. For example, the controller 60 adds the consumed flow rate in the operation of the VVT and/or the consumed flow rate in the operation of the oil jets, to the target flow rate.

Then, at S11, the controller 60 compares the target flow rate with the duty ratio map and sets the target duty ratio. At S12, the controller 60 reads a current duty ratio of the control signal, and determines whether the current duty ratio matches the target duty ratio. If the current duty ratio does not match the target duty ratio, at S13, the controller 60 applies the target duty ratio to the duty ratio of the control signal and outputs the control signal to the oil control valve 84. Then the controller 60 proceeds to S14. On the other hand, if the current duty ratio matches the target duty ratio, the controller 60 skips S13 and proceeds to S14.

At S14, the controller 60 reads the actual oil pressure from the oil pressure sensor 50a. Then at S15, the controller 60 determines whether the actual oil pressure matches the target oil pressure of S7.

If the actual oil pressure does not match the target oil pressure, at S16, the controller 60 adjusts the duty ratio of the control signal based on the deviation between the actual oil pressure and the target oil pressure, and outputs the control signal to the oil control valve 84. Then at S17, the controller 60 reads the actual oil pressure from the oil pressure sensor 50a, and at S18, the controller 60 determines whether the actual oil pressure matches the target oil pressure of S7. If the actual oil pressure matches the target oil pressure, the controller 60 proceeds to S20. On the other hand, if the actual oil pressure does not match the target oil pressure, at S19, the controller 60 determines whether the actual oil pressure is the base oil pressure P1 read at S6 or above. If the actual oil pressure is the base oil pressure P1 read at S6 or above, the controller 60 returns to S16 to adjust the duty ratio again. The controller 60 repeats S16 to S19 to match the actual oil pressure with the target oil pressure.

Note that if the actual oil pressure matches the target oil pressure at S15, the controller 60 skips S16 to S18 and proceeds to S20.

At S20, the controller 60 reads the engine load, the engine speed, and the oil temperature. Further at S21, the controller 60 determines whether at least one of the engine load, the engine speed, and the oil temperature is different from the values read at S1. If at least one of the engine load, the engine speed, and the oil temperature is not different, the controller 16 returns to S14 and repeats the control from the processing of reading the actual oil pressure. Specifically, since the target oil pressure is constant when the engine load, the engine speed, and the oil temperature are not changed, the controller 60 continues to check whether the actual oil pressure matches the target oil pressure, and once the actual oil pressure shifts from the target oil pressure, by performing S16 to S19, the controller 60 matches the actual oil pressure with the target oil pressure.

On the other hand, if at least one of the engine load, the engine speed, and the oil temperature is different, the controller 60 returns to S2 and repeats the control therefrom. Specifically, the controller 60 repeats from setting the target oil pressure.

On the other hand, if the actual oil pressure is below the base oil pressure P1 at S19, the controller 60 determines, at S22, that the oil supply system 200 including the hydraulically-operated devices has malfunctioned, and shifts to a failsafe mode at S23. In the failsafe mode, the controller 60 issues an alarm, restricts the operating state of the engine 100, and changes the control signal to maximize the discharge amount of the oil pump 81.

Since the target oil pressure is set to a highest pressure among the base oil pressure P1, the required oil pressure(s) P2, and the improving oil pressure P3 as described above, the target oil pressure is always the base oil pressure P1 or above. In other words, in the discharge amount control, the target oil pressure is set to the base oil pressure P1 or above. Thus, while the flow rate control is suitably performed, the actual oil pressure is the base oil pressure P1 or above. A case where the actual oil pressure falls below the base oil pressure P1 is a case where the discharge amount control is not suitably performed, for example, when high leakage occurs and the actual oil pressure cannot suitably be increased. Therefore, when the actual oil pressure is below the base oil pressure P1, the controller 60 shifts to the failsafe mode. As described above, the base oil pressure P1 is not only used for setting the target oil pressure, but also for determining a malfunction.

In the failsafe mode, the controller 60 lights an alarm lamp and/or issues an alarm sound, for example. Further, the controller 60 restricts the operating state of the engine 100 from being an operating state in which the required oil pressure from any of the hydraulically-operated devices becomes high. Additionally, the controller 60 maximizes the volume of the oil pump 81 to secure the lubrication and cooling performance by the oil and the operations of the hydraulically-operated devices as much as possible.

Next, the operations of this embodiment are described.

(1) In this embodiment, in the oil supply system 200 for the engine 100 including the controller 60 for controlling the variable displacement oil pump 81, which is capable of adjusting the discharge amount of oil, to adjust the discharge pressure of the variable displacement oil pump 81 to the target oil pressure corresponding to the engine operating state, the airflow sensor 62 for detecting the engine load, and the oil temperature sensor 63 for detecting the temperature of the oil are provided. In order to increase the amount of the oil mist flowing inside the crank case 4, when the engine load is low, which corresponds to when the air amount detected by the airflow sensor 62 (engine load) is close to zero, the controller 60 controls the variable displacement oil pump 81 to increase the discharge amount as the oil temperature detected by the oil temperature sensor 63 becomes lower, the oil mist generated by the oil flowing out of the bearing metals 29 of the crankshaft bearings 28 rotatably supporting at least the crankshaft 26, and atomized.

According to this configuration, since the discharge amount of the variable displacement oil pump 81 is increased to raise the oil mist amount inside the crank case 4 as the oil temperature becomes lower when the engine load is low (e.g., during the idle operation), the atmospheric lubrication performance by the oil mist, in other words, the lubricating oil films of the sliding surfaces of the drive force transmission system members (e.g., the piston 24, the pin boss of the piston 24, the piston pin, and the smaller end part of the connecting rod 25), is secured even when the engine load is low (e.g., during the idle operation). Thus, the lubrication oil films become cushions and the engine noise can be reduced.

(2) In this embodiment, the controller 60 performs the discharge amount control of the variable displacement oil pump 81 when the engine load is low in the warming-up operation state of the engine 100.

According to this configuration, particularly when the discharge amount is adjusted to achieve the required oil pressure corresponding to the engine operating state, and when the engine load is low in the warming-up operation state of engine 100 in which a drive force of the variable displacement oil pump 81 can be suppressed to the necessary minimum level, the atmospheric lubrication performance by the oil mist is secured and the engine noise can reliably be reduced.

(3) In this embodiment, the hydraulically-operated devices using the oil as the operational oil, the to-be-lubricated parts using the oil as the lubricating oil, and the oil pressure sensor 50 for detecting the discharge pressure of the variable displacement oil pump 81 are provided. The controller 60 sets, as the target oil pressure, the highest required oil pressure among the required oil pressures set for the hydraulically-operated devices and the to-be-lubricated parts according to the engine operating state, and the controller 60 controls the variable displacement oil pump 81 to adjust the discharge pressure detected by the oil pressure sensor 50a to reach the target oil pressure.

According to this configuration, the drive force of the variable displacement oil pump 81 is suppressed to the necessary minimum level and a fuel consumption can be improved while satisfying the required oil pressures of the hydraulically-operated devices and the to-be-lubricated parts corresponding to the engine operating state.

(4) In this embodiment, the controller 60 has the base oil pressure map (FIG. 5) storing the base oil pressure P1 set according to the engine speed at the predetermined oil temperature T, the atmospheric lubrication improving oil pressure map (FIG. 6) storing the atmospheric lubrication improving oil pressure P3 set to increase the discharge amount as the oil temperature becomes lower when the engine load is low, and the required oil pressure map for the oil jet 71 (FIG. 7), and the required oil pressure map for the exhaust VVT 18 (FIG. 8) storing the required oil pressures P2 set for the respective hydraulically-operated devices according to the engine operating state. The controller 60 sets the highest oil pressure among the oil pressures stored in the maps to be the target oil pressure according to the engine operating state (S7 in FIG. 10).

According to this configuration, the target oil pressure corresponding to the engine operating state can reliably be set with the simple configuration. Additionally, due to the existence of the atmospheric lubrication improving oil pressure map, a sufficient atmospheric lubrication performance by the oil mist when the engine load is low can be secured.

(5) In this embodiment, the hydraulically-operated device is the exhaust VVT 18, and the controller 60 restricts the operation of the exhaust VVT 18 when the engine load is low.

According to this configuration, by restricting the operation of the exhaust VVT 18 of which the required oil pressure is comparatively high, the large part of the discharge amount of the variable displacement oil pump 81 which has already been increased can be suppressed from flowing to the exhaust VVT 18 and from being consumed. Therefore, the oil mist amount for the atmospheric lubrication can reliably be increased with the simple configuration.

Figure 12:
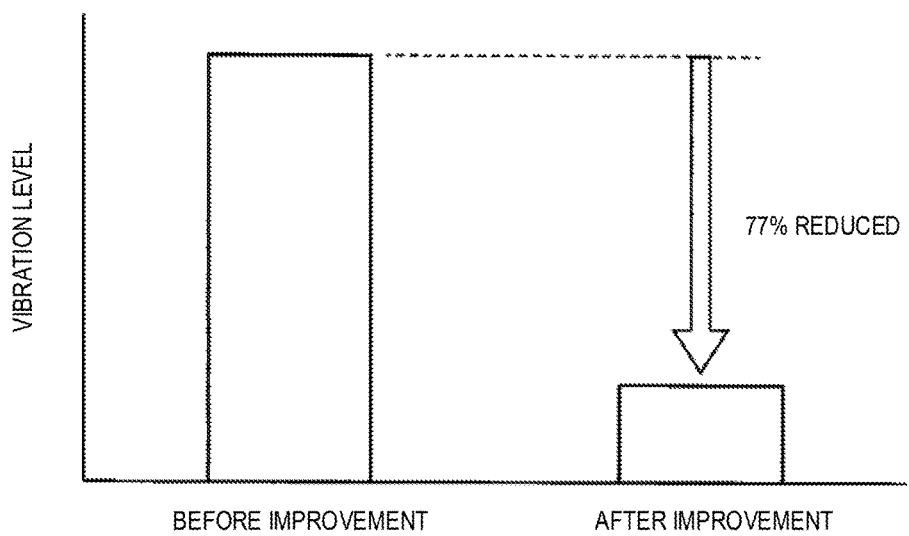
FIG. 12 is a chart illustrating reduction data of engine noise (vibration level).

(6) FIG. 12 illustrates reduction data of the engine noise (vibration level) before and after the noise improvement according to this embodiment. Specifically, by using a four-cycle gasoline engine of an inline four-cylinder spark-ignition type, a vibration level was measured when the accelerator is fully closed and the engine load is low within the low engine speed range (during the idle operation) including 500 and 700 rpm. Before the improvement, a case where the map of the base oil pressure P1 in FIG. 5, the map of the required oil pressure P2 of the oil jet 71 in FIG. 7, and the map of the required oil pressure P2 of the exhaust VVT 18 in FIG. 8 are used for setting the target oil pressure of the variable displacement oil pump 81 was considered, and after the improvement, a case where the atmospheric lubrication improving oil pressure P3 in FIG. 6 is additionally used for setting the target oil pressure was considered. After the improvement, as a result of taking the atmospheric lubrication improving oil pressure P3 in FIG. 6 into consideration, the oil mist amount inside the crank case 4 increased, and thus, the atmospheric lubrication performance by the oil mist was secured and the vibration level was reduced by 77% from before the improvement.

Note that in this embodiment, the engine is a spark-ignition gasoline engine; however, the present invention is not limited by the type of the engine, and, for example, a compression self-ignition engine, such as a diesel engine, may be applied.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

4 Crank Case
5 Oil Supply Path
18 Exhaust Variable Valve Timing Mechanism (Hydraulically-operated Device)
26 Crankshaft
28 Crankshaft Bearing
29 Bearing Metal (To-be-lubricated Part, Second Device)
50*a* Oil Pressure Sensor (Discharge Pressure Detector)
60 Controller (Oil Pressure Controller, Base Oil Pressure Memory, First Memory, Second Memory, Setting Module)
62 Airflow Sensor (Load Detector)
63 Oil Temperature Sensor (Oil Temperature Detector)
71 Oil Jet (Hydraulically-operated Device, First Device)
81 Variable Displacement Oil Pump
100 Engine
200 Oil Supply System

What is claimed is:

1. An oil supply system for an engine, comprising:
an oil pressure controller for controlling a variable displacement oil pump to adjust a discharge pressure thereof to reach a target oil pressure corresponding to an operating state of the engine, the variable displacement oil pump capable of adjusting a discharge amount of oil;
an airflow sensor for detecting an engine load; and
an oil temperature sensor for detecting a temperature of the oil,
wherein when the engine load detected by the airflow sensor is low, to increase an amount of oil mist flowing inside a crank case of the engine, the oil pressure controller controls the variable displacement oil pump to increase the discharge amount as the oil temperature detected by the oil temperature sensor becomes lower, the oil mist generated by the oil flowing out of a bearing part rotatably supporting at least a crankshaft, and being atomized, the engine load being considered low when falling below a predetermined reference load; and
wherein the oil pressure controller sets an increase amount of the target oil pressure to be larger as the oil temperature detected by the oil temperature sensor becomes lower.

2. The oil supply system of claim 1, wherein the oil pressure controller performs a discharge amount control of the variable displacement oil pump when the engine load is low in a warming-up operation state of the engine.

3. The oil supply system of claim 2, further comprising:
a first device using oil as operational oil thereof;
a second device using oil as lubricating oil thereof; and
a discharge pressure detector for detecting the discharge pressure of the variable displacement oil pump,
wherein the oil pressure controller sets, to a target oil pressure, a highest required oil pressure among required oil pressures set for the respective devices according to the operating state of the engine, and the oil pressure controller controls the variable displacement oil pump to adjust the discharge pressure detected by the discharge pressure detector to reach the target oil pressure.

4. The oil supply system of claim 3, wherein the oil pressure controller includes:
a base oil pressure memory storing a base oil pressure set according to an engine speed at a predetermined oil temperature;
a first memory storing an oil pressure set to increase the discharge amount as the oil temperature becomes lower when the engine load is low;
a second memory storing a required oil pressure set for the first device according to the operating state of the engine; and
a setting module for setting the highest oil pressure among the oil pressures stored in the memories, to be the target oil pressure according to the operating state of the engine.

5. The oil supply system of claim 3, wherein the first device is a variable valve timing mechanism, and
wherein the oil pressure controller restricts operation of the variable valve timing mechanism when the engine load is low.

* * * * *